United States Patent
Gruber

(10) Patent No.: US 6,644,218 B2
(45) Date of Patent: Nov. 11, 2003

(54) SHOCK ABSORBING POD

(75) Inventor: Robert V. Gruber, Hermosa Beach, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 73 days.

(21) Appl. No.: 09/949,390

(22) Filed: Sep. 8, 2001

(65) Prior Publication Data

US 2003/0047121 A1 Mar. 13, 2003

(51) Int. Cl.[7] ............................................. B65D 19/38
(52) U.S. Cl. ...................................................... 108/57.12
(58) Field of Search ............................. 108/57.12, 57.29, 108/902, 901; 248/638, 636, 619, 618, 632, 634, 624, 625, 562, 560

(56) References Cited

U.S. PATENT DOCUMENTS

| 1,747,352 A | * | 2/1930 | Devine, Jr. |
| 1,830,058 A | | 11/1931 | Helmond |
| 1,894,453 A | | 1/1933 | Sutton |
| 2,602,616 A | | 7/1952 | Helmond |
| 2,610,010 A | | 9/1952 | Dodge |
| 2,893,665 A | | 7/1959 | Paulsen |
| 2,921,760 A | | 1/1960 | Wheeler |
| 3,090,331 A | * | 5/1963 | McCann |
| 3,267,882 A | | 8/1966 | Rapson et al. |
| 3,276,530 A | * | 10/1966 | Borneman |
| 3,351,027 A | | 11/1967 | Ellard, Jr. et al. |
| 3,412,502 A | | 11/1968 | Riches |
| 3,426,986 A | * | 2/1969 | Pool |
| 3,440,976 A | | 4/1969 | Burne |
| 3,750,598 A | * | 8/1973 | Campbell et al. |
| 4,051,787 A | | 10/1977 | Nishitani et al. |
| 4,533,109 A | * | 8/1985 | Delam |
| 5,017,328 A | | 5/1991 | Mazurek |
| 5,226,372 A | * | 7/1993 | Frenkel et al. |
| 5,293,782 A | * | 3/1994 | Long et al. |
| 5,588,371 A | * | 12/1996 | Looker |
| 5,615,429 A | | 4/1997 | Williams |
| 5,649,492 A | | 7/1997 | Chin-Sue |
| 5,666,886 A | | 9/1997 | Alexander et al. |
| 5,878,984 A | | 3/1999 | Grieser et al. |
| 6,006,677 A | | 12/1999 | Apps et al. |
| 6,173,659 B1 | | 1/2001 | Danks et al. |

FOREIGN PATENT DOCUMENTS

| WO | WO 00/71431 A1 | 11/2000 |
| WO | WO 01/14216 A1 | 3/2001 |

* cited by examiner

Primary Examiner—Jose V. Chen

(57) ABSTRACT

A pod for absorbing shock placed on a load includes a rigid body, a rigid face, and a spring assembly. The face is positioned above the body for attachment to the underside of a load placed on the face. The spring assembly connects the body to the face. The spring assembly absorbs shock placed on the load during momentum changes felt by the load during transit or while being placed on a support surface. The pod may also be incorporated into a pallet assembly.

23 Claims, 4 Drawing Sheets

SHOCK ABSORBING POD

BACKGROUND OF THE INVENTION

1. Field of the Invention

The present invention relates generally to shock absorbing mechanisms and, more particularly, to a shock absorbing pod and to the devices which incorporate such pods.

2. Background Art

Shock absorbing mechanisms absorb the shock experienced by a load when the load is moved from a position above ground and placed onto the ground or other stationary support. Shock absorbing mechanisms also absorb the shock experienced by a load when the load is in transit.

Such shock absorbing mechanisms include foam cylinders having a top adhesive surface. In operation, an operator places the foam cylinders on a stable position such as the ground. The operator then places a load onto the foam cylinders such that the foam cylinders are interposed between the load and the ground. For instance, the load may be boxes of soda cans or fruit which the operator places onto the foam cylinders.

The top surfaces of the foam cylinders stick to the underside of the load as the weight of the load compresses the foam cylinders. An operator maneuvers a fork lift or the like to insert the forks under the load between channels defined by the foam cylinders. The fork lift then moves the load with the attached foam cylinders off of the ground. Once the fork lift lifts the load and the attached foam cylinders off of the ground, the foam cylinders return to their natural uncompressed state as the fork lift carries the entire weight of the load. The fork lift then transports the load with the attached foam cylinders above the ground to a desired location. At the desired location, the fork lift lowers the load to place the load onto the ground. As the fork lift lowers the load onto the ground, the foam cylinders compress under the weight of the load and absorb the shock experienced by the load as the load is being placed onto the ground.

Typically, the load with the attached foam cylinders are placed within a vehicle for transit to another destination. During transit, the vehicle and the load may experience bumpiness as a result of the vehicle traversing over bumpy roads and the like. The bumpiness may subject a shock on the load which would cause the load to experience movement.

However, a problem associated with foam cylinders is that the shock absorbing characteristics are not ideal because of material properties. Foam cylinders have little durability resulting in decreased shock absorbing capability over use. The lack of durability may cause the foam cylinders to be non-reusable. As a result, the foam cylinders may not absorb the entire shock experienced by the load when the load is being placed onto the ground or when the load is in transit. Consequently, the load may feel shock which could damage the load.

SUMMARY OF THE INVENTION

Accordingly, it is an object of the present invention to provide a shock absorbing pod having improved shock absorbing characteristics.

It is another object of the present invention to provide a shock absorbing pod having shock absorbing spring assemblies for absorbing the shock experienced by a load when the load is experiencing momentum such as when the load is being placed from a position above ground onto the ground or when the load is in transit.

It is a further object of the present invention to provide a one piece shock absorbing pod made from injection molded plastic to slow the rate of deceleration of a load for absorbing the shock experienced by the load.

It is still another object of the present invention to provide a shock absorbing pod having a rigid face for attachment to the underside of a load and a rigid body portion connected together by at least one spring assembly which is operable for absorbing the shock experienced by a load.

It is still a further object of the present invention to provide a pallet assembly having a deck member and a shock absorbing pod for absorbing the shock experienced by a load.

In carrying out the above objects and other objects, the present invention provides a pod arranged to support a load and absorb shock experienced by the load. The pod includes a rigid lower member and a rigid upper member. The upper member is positioned apart from the lower member for attachment to the underside of a load placed on the upper member. At least one spring member connects the lower and upper members. The at least one spring member absorbs shock experienced by the load.

Further, in carrying out the above objects and other objects, the present invention provides a pallet assembly arranged to support a load and absorb shock experienced by the load. The pallet assembly includes a deck member and an integral pod attached to one side of the deck member to form a unitary construction. The pod includes a rigid lower member, a rigid upper member, and at least one spring member. The upper member is positioned apart from the lower member and is attached to the one side of the deck member. The at least one spring member connects the lower and upper members and absorbs shock experienced by a load being supported by the deck member.

The advantages associated with the present invention are numerous. For example, the pod and pallet assembly in accordance with the present invention slow sudden momentum changes subjected on a load in order to absorb shock experienced by the load when the load is being transported in a vehicle or when the load is being placed onto a support surface.

The above objects and other objects, features, and advantages of the present invention are readily apparent from the following detailed description when taken in connection with the accompanying drawings.

DETAILED DESCRIPTION OF THE PREFERRED EMBODIMENT(S)

Figure 1:
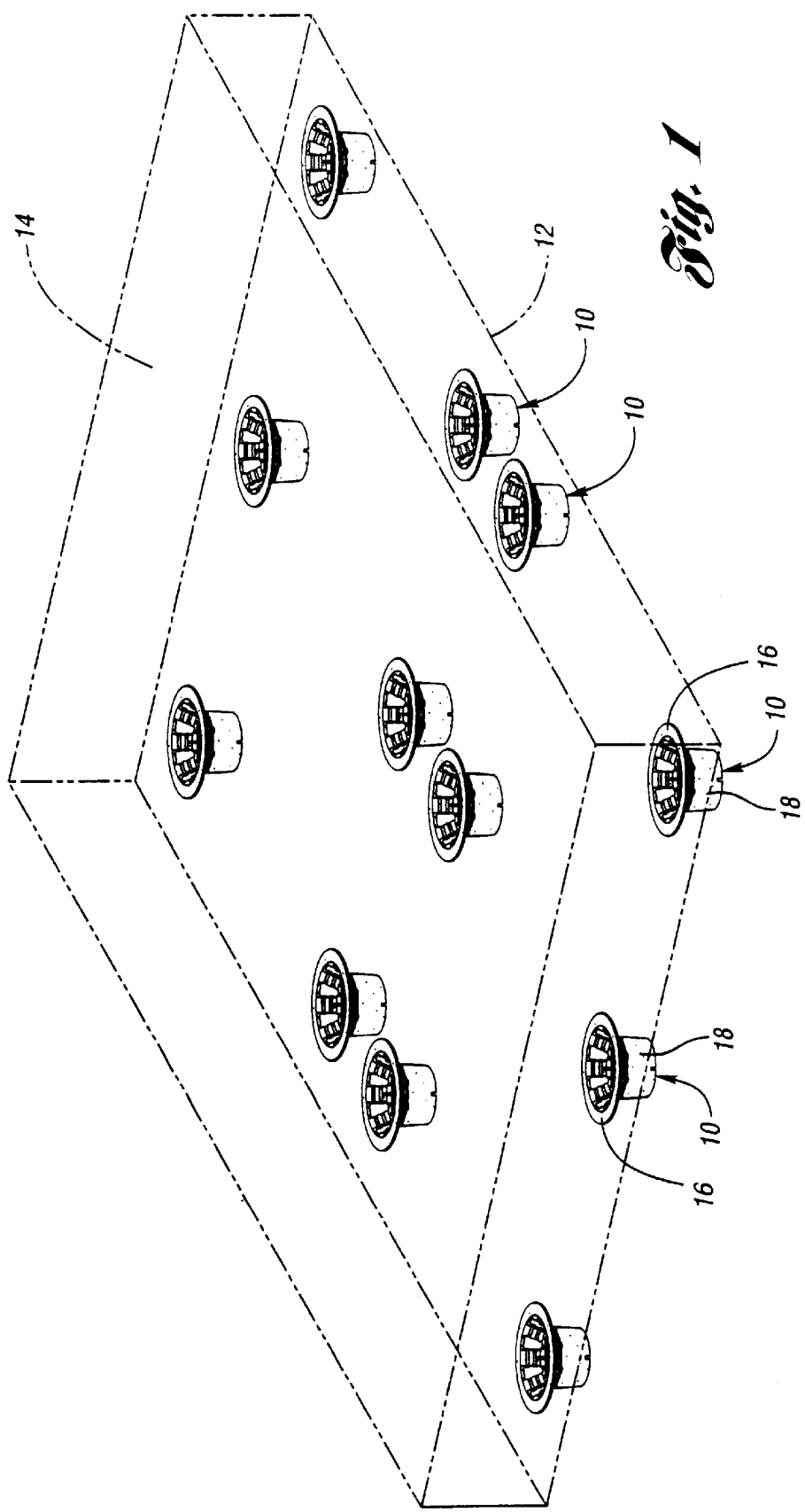
FIG. 1 illustrates shock absorbing pods attached to the underside of a load shown in phantom in accordance with the present invention.
Figure 2:
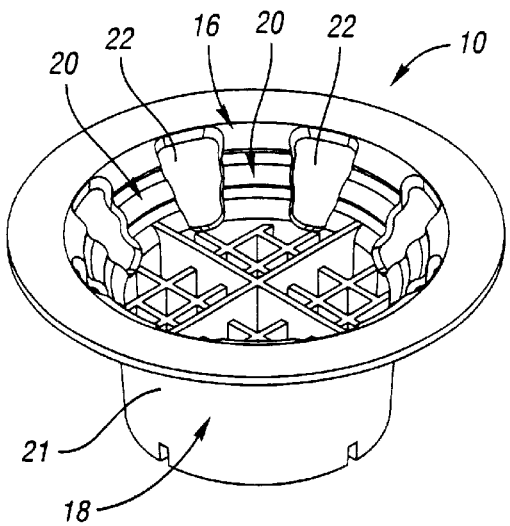
FIG. 2 illustrates a perspective view of a shock absorbing pod in accordance with the present invention.

Referring now to FIG. 1, shock absorbing pods 10 in accordance with the present invention are shown. In FIG. 1, pods 10 are attached to an underside 12 of a load 14 shown in phantom. Load 14 and pods 10 may be supported above a support surface such as the ground or a vehicle cargo surface by a device such as a fork lift (not shown). Load 14 and pods 10 may also be placed on a support surface such as the ground or a vehicle cargo surface with the pods interposed between the load and the support surface. When placed on a support surface pods 10 support the entire weight of load 14 and keep the load from touching the support surface. Load 14 may be any type of load such as a single or multi-level rectangular array of boxes or a piece of equipment. The boxes may include various types of goods such as soda cans, beer bottles, fruit, and the like.

Each pod 10 generally includes a rigid top member 16 and a rigid bottom member 18 connected by at least one spring member 20. In the embodiment illustrated, each pod 10 includes a substantially flat and rigid top circular rim surface 16 (attachment face) and a rigid bottom body portion 18 (stable base). Load 14 is placed on pods 10 such that attachment faces 16 contact underside 12 of the load. Attachment faces 16 are attached to underside 12 of load 14 and the attachment may be by various methods including adhesive, mechanical fasteners, and the like. When load 14 is moved above the ground, pods 10 move with the load as the load moves because the pods are attached to the underside of the load. When the load is placed onto a support surface, bottom body portions 18 of pods 10 contact the support surface such that the pods support the entire weight of load 14 and keep the load from touching the support surface.

As will be described in greater detail below, pods 10 are configured to absorb the shock placed on load 14 when the load experiences a change in momentum. Such momentum changes include a momentum change experienced by load 14 when the load is being moved from a position above a support surface onto the support surface. Load 14 may also feel momentum changes when the load experiences bumpiness during transit while positioned on a vehicle cargo surface. Pods 10 function to cushion and absorb the shock placed on load 14 as a result of momentum changes. For example, pods 10 slow the rate of deceleration felt by load 14 when the load is being placed onto a support surface or is in transit in order to absorb any potential shock felt by the load.

Referring now to FIGS. 2, 3, 4, 5, 6, 7, 8A, 8B, and 8C, various views of a pod 10 are shown. Pod 10 is preferably a unitary member formed of a thermoplastic or other polymeric material and is preferably formed of injection molded components. In addition to top attachment face 16 and bottom body portion 18, pod 10 includes one or a plurality of spring assemblies 20. Spring assemblies 20 connect attachment face 16 to body portion 18 such that the attachment face is spaced apart from the bottom body portion and extends above and around the bottom body portion. In the embodiment illustrated, pod 10 includes eight spring assemblies 20. Windows 22 separate spring assemblies 20 such that the spring assemblies are spaced apart from one another.

Pod 10 (or a group of pods) support the entire weight of load 14 when the load is positioned on a support surface with the pod interposed therebetween. When load 14 being supported by pod 10 experiences momentum changes during transit or while being placed onto the support surface, spring assemblies 20 of pod 10 flex between rigid top attachment face 16 and rigid bottom body portion 18 in order to cushion and absorb the additional forces caused by the momentum changes. As a result of absorbing the additional forces, spring assemblies 20 slow any movements caused by the momentum change to load 14 thereby preventing any potential damage to the load.

The number of spring assemblies 20 and size of windows 22 fine the spring coefficient of pod 10. Accordingly, pod 10 can have different spring coefficients depending on the projected type and weight of the load that the pod is intended to support.

In the embodiment illustrated, attachment face 16 includes an inner circular circumference defined by an inner rim surface edge 17 and an outer circular circumference defined by an outer rim surface edge 19. Bottom body portion 18 includes an outer circular circumference fined by an outer surface 21 of the bottom body portion. The inner circular circumference of attachment face 16 is greater than the outer circular circumference of bottom body portion 18 such that the attachment face extends around the bottom body portion in a plane parallel to a top surface 23 of the bottom body portion above the bottom body portion.

Bottom body portion 18 further includes a bottom surface 25. Bottom surface 25 is in a plane substantially parallel with respect to top surface 23. Between top and bottom surfaces 23 and 25, bottom body portion 18 includes a support unit having a grid of interconnecting supports 27. Cavities 29 are formed between interconnecting supports 27 in order to reduce the overall weight of pod 10. Interconnecting supports 27 are configured in order to support the outer wall of bottom body portion 18.

Figure 3:
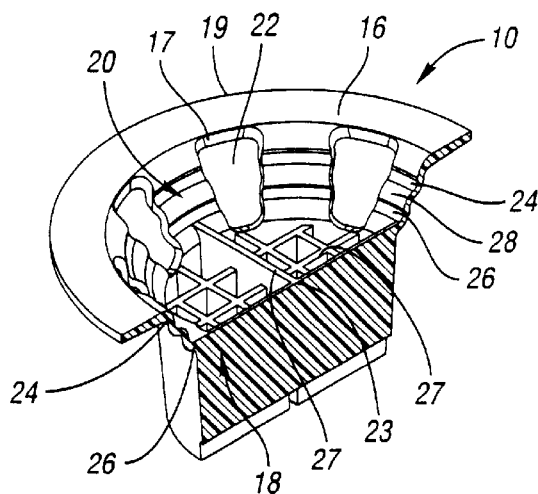
FIG. 3 illustrates a cut-away perspective view of the shock absorbing pod.
Figure 4:
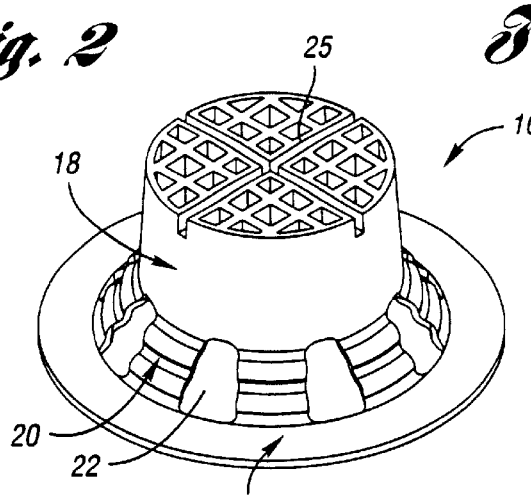
FIG. 4 illustrates a bottom perspective view of the shock absorbing pod.
Figure 5:
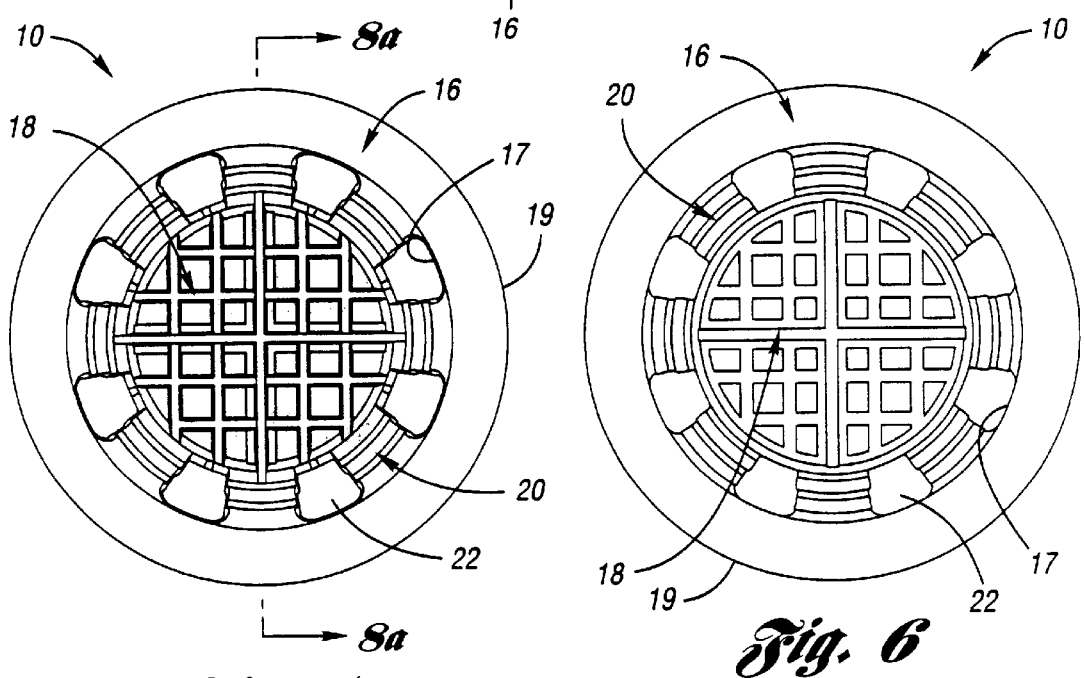
FIG. 5 illustrates a top plan view of the shock absorbing pod.
Figure 6:
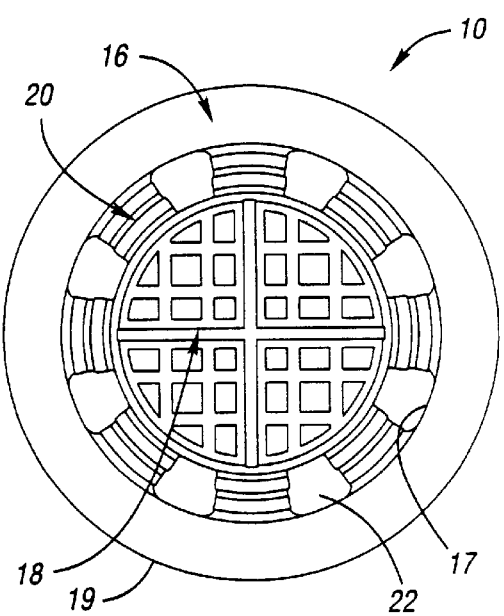
FIG. 6 illustrates a bottom plan view of the shock absorbing pod.
Figure 7:
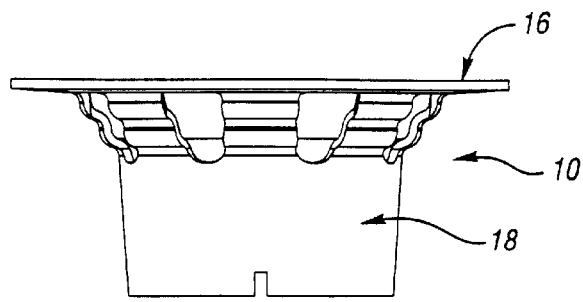
FIG. 7 illustrates a side elevational view of the shock absorbing pod.

As best shown in FIG. 3, spring assemblies 20 are connected at one edge 24 to top attachment face 16 and are connected at a second edge 26 to bottom body portion 18. Each spring assembly 20 includes a central curvilinear body member 28 extending between top attachment face 16 and bottom body portion 18.

Figure 8A:
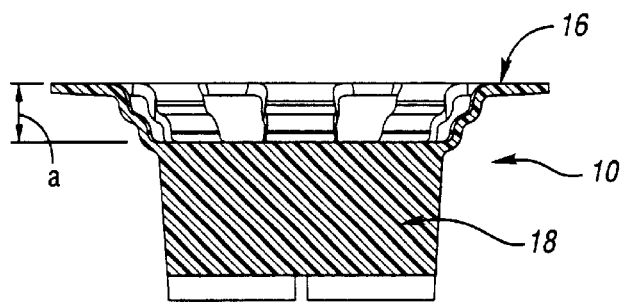
FIG. 8A illustrates a cross-sectional view of the shock absorbing pod looking along the line 8—8 shown in FIG. 5.

As shown in FIG. 8A, spring assemblies 20 separate attachment face 16 and bottom body portion 18 by an uncompressed distance (a) when pod 10 is in an uncompressed natural state. Pod 10 is in the uncompressed natural state when load 14 is at rest on pod 10 or the weight of the load on the pod is being supported by an external device such as a fork lift.

Figure 8B:
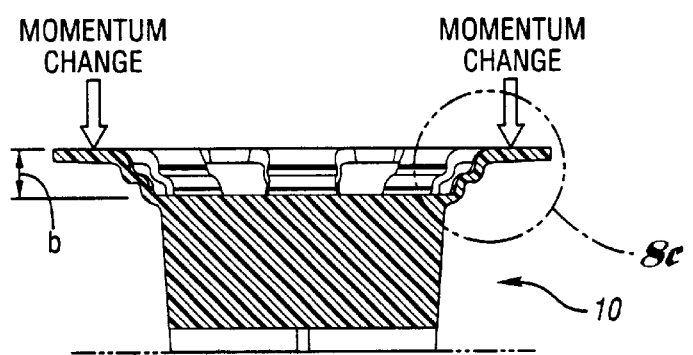
FIG. 8B illustrates a cross-sectional view of the shock absorbing pod with flexed spring assemblies looking along the line 8—8 shown in FIG. 5.
Figure 8C:
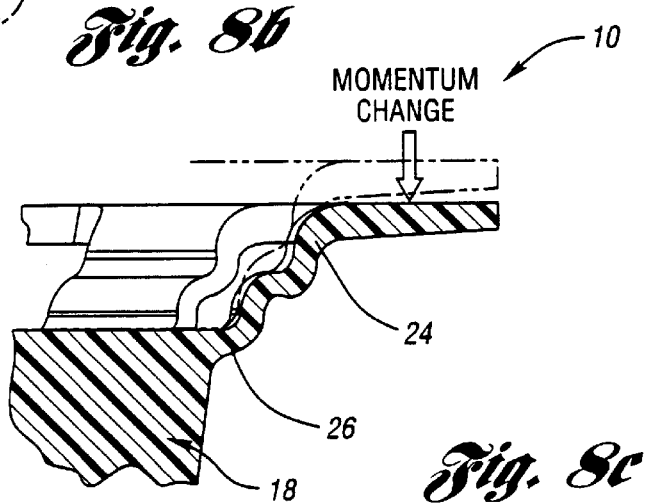
FIG. 8C illustrates a blown up view of the circled area shown in FIG. 5.

Referring now to FIGS. 8B and 8C, with continual reference to FIG. 8A, pod 10 in a flexed state is shown. Pod 10 is in the flexed state when spring assemblies 20 flex in order to absorb momentum changes experienced by load 14. As shown in FIG. 8B, spring assemblies 20 flex under the increased force experienced by load 14 caused by momentum changes. As spring assemblies 20 flex, the spring assemblies separate attachment face 16 and bottom body portion 18 by a compressed distance (b). The compressed distance (b) is smaller than uncompressed distance (a) such that attachment face 16 and bottom body portion 18 are closer together when spring assemblies 20 flex.

Load 14 can feel an increased force when a fork lift lowers the load and attached pod 10 onto the ground. As load 14 and attached pod 10 are placed onto the ground, the weight of the load is removed from the fork lift and supported by pod 10. Because load 14 is being lowered, the load may feel deceleration as pod 10 touches the ground. As described above, spring assemblies 20 flex in order to slow the rate of deceleration felt by load 14 in order to cushion and absorb any shock experienced by the load as pod 10 touches the ground.

Likewise, spring assemblies 20 flex and unflex to absorb momentum changes felt by load 14 while in transit. For instance, when a vehicle transporting load 14 goes over a bump in the road, load 14 will feel a momentum change. Spring assemblies 20 flex in order to slow the rate of deceleration of load 14.

Figure 9:
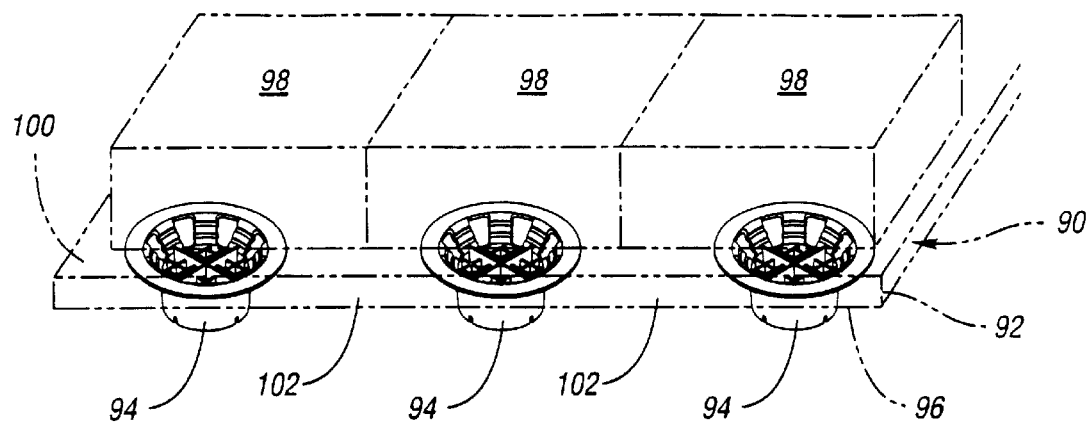
FIG. 9 illustrates a pallet assembly in accordance with the present invention having shock absorbing pods attached to the underside of a pallet deck with a load being supported by the pallet assembly.

In addition to being attached to underside 12 of load 14, pods 10 may be integrally formed to a pallet deck or other support piece to form a unitary pallet assembly. Referring now to FIG. 9, a pallet assembly 90 in accordance with the present invention is shown. Pallet assembly 90 includes a pallet deck 92. The attachment faces of shock absorbing pods 94 in accordance with the present invention are attached to an underside 96 of pallet deck 92. Pods 94 separate pallet deck 92 from a support surface when pallet assembly 90 is placed on the support surface. Pallet assembly 90 is formed of a thermoplastic or other polymeric material and is preferably formed of injection molded components. A load 98 such as a plurality of boxes filled with goods may be placed on a top side 100 of pallet deck 92.

Pods 94 are spaced apart to define a plurality of fork lift tine receiving channels 102 beneath underside 96 of pallet deck 92. As pallet assembly 90 is lowered by the fork lift, pods 94 touch the support surface and support the weight of pallet deck 92 and load 98. As described above, the spring assemblies of pods 94 flex in order to absorb the shock felt by load 98 as it and pallet assembly 90 are being lowered onto the support surface.

Figure 10:
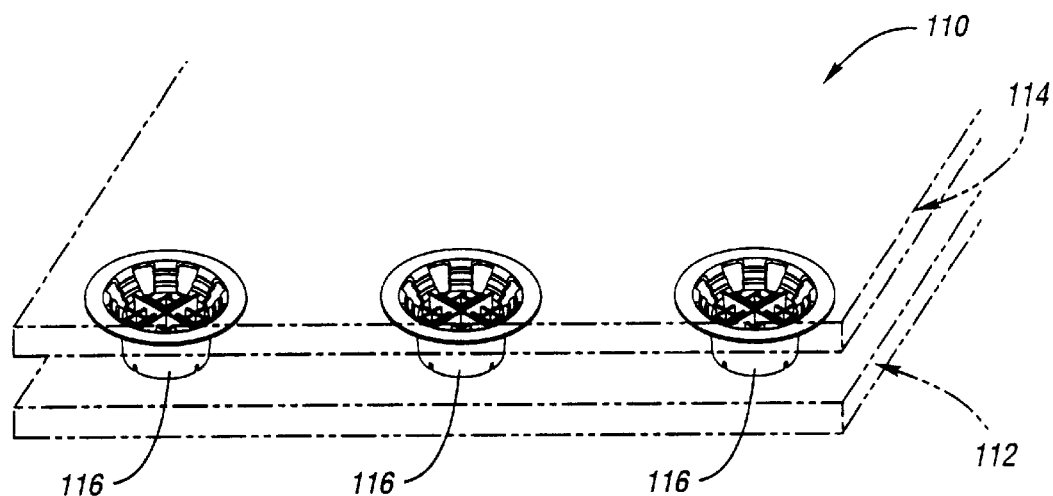
FIG. 10 illustrates a pallet assembly in accordance with an alternative embodiment of the present invention.

Referring now to FIG. 10, a pallet assembly 110 in accordance with an alternative embodiment of the present invention is shown. Pallet assembly 110 generally differs from pallet assembly 90 by including a bottom pallet deck 112 in addition to a top pallet deck 114 and shock absorbing pods 116. The attachment faces of pods 116 are attached to the underside of top pallet deck 114. The bottom body portions of pods 116 are attached to the top side of bottom pallet deck 112. Pallet assembly 110 is formed of a thermoplastic or other polymeric material and is preferably formed of injection molded components. In operation, pallet assembly 110 functions similarly to pallet assembly 90 in order to absorb the shock placed on a load being supported by pallet assembly 110. In this embodiment, pods 116 serve as columns between pallet decks 112 and 114.

Figure 11:
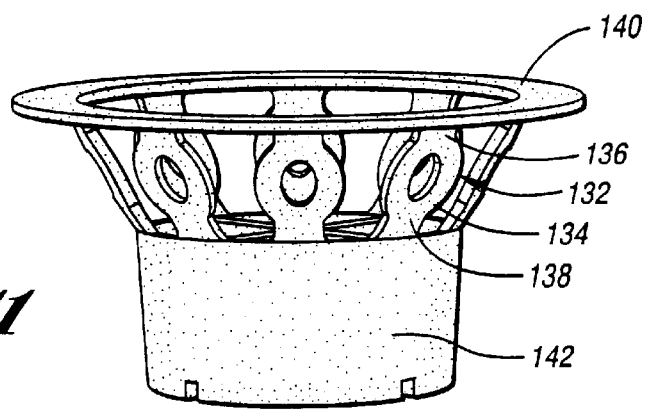
FIG. 11 illustrates a shock absorbing pod in accordance with an alternative embodiment of the present invention.

Referring now to FIG. 11, a shock absorbing pod 130 in accordance with an alternative embodiment of the present invention is shown. Pod 130 generally differs from pod 10 by including alternative spring assemblies 132 in place of spring assemblies 20. Each spring assembly 132 includes an oval spring 134, a top member 136, and a bottom member 138. Top member 136 of each spring assembly 132 connects oval spring 134 to rigid attachment face 140. Bottom member 138 of each spring assembly 132 connects oval spring 134 to rigid bottom body portion 142. Of course, instead of spring assemblies 20 and spring assemblies 132, other spring assemblies may be incorporated into pods as described herein.

It is further noted that both pods 10 and pods 130 are nestable with one another in order to facilitate storage and shipment of the pods. The bottom body portion of a first pod fits within the top attachment face of a second pod to rest on the top surface of the body portion of the second pod. This process is repeated such that a plurality of pods are arranged on top of one another in a stack.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A pod arranged to support a load and absorb shock experienced by the load, the pod comprising:
    a rigid lower member;
    a rigid upper member positioned apart from the lower member for attachment to the underside of a load placed on the upper member, the upper member having an opening disposed over the lower member; and
    at least one spring member disposed about the periphery of the opening of the upper member, the at least one spring member connecting the lower member to the upper member, wherein the at least one spring member absorbs shock experienced by the load.

2. The pod of claim 1 wherein:
    the at least one spring member includes a plurality of spring members each separated by a window.

3. The pod of claim 2 wherein:
    the plurality of spring members and the windows define a spring coefficient.

4. The pod of claim 1 wherein:
    the upper member, the lower member, and the at least one spring member are a unitary member.

5. The pod of claim 4 wherein:
    the upper member, the lower member, and the at least one spring member are formed of injection molded plastic.

6. The pod of claim 1 wherein:
    the upper member is a circular rim.

7. The pod of claim 1 wherein:
    the at least one spring member is flexibly movable to absorb shock experienced by the load during a momentum change felt by the load.

8. The pod of claim 1 wherein:
    the at least one spring member is flexibly movable to absorb shock experienced by the load when the load is in transit.

9. The pod of claim 1 wherein:
    the lower member includes a bottom surface having a plurality of intersecting supports having cavities in between.

10. The pod of claim 1 wherein:
    the upper member has an inner circular circumference defined by an inner edge of the upper member around the opening of the upper member and the lower member has an outer circular circumference defined by an outer surface of the lower member, wherein the inner circular circumference of the upper member is greater than the outer circular circumference of the lower member.

11. A pallet assembly arranged to support a load and absorb shock experienced by the load, the pallet assembly comprising:

a deck member and an integral pod attached to one side of the deck member to form a unitary construction, wherein the pod includes a rigid lower member, a rigid upper member, and at least one spring member, wherein the upper member is positioned apart from the lower member and is attached to the one side of the deck member, wherein the upper member has an opening disposed over the lower member, wherein the at least one spring member is disposed about the periphery of the opening of the upper member, connects the lower member to the upper member, and absorbs shock experienced by a load being supported by the deck member.

12. The pallet assembly of claim 11 wherein:

the lower member, the upper member, and the at least one spring member of the pod are a unitary member.

13. The pallet assembly of claim 11 further comprising:

a second deck member attached to the underside of the lower member.

14. The pallet assembly of claim 11 wherein:

the at least one pod includes a plurality of pods spaced apart from one another to fine channels beneath the one side of the deck member.

15. The pallet assembly of claim 11 wherein:

the at least one spring member is flexibly movable to absorb shock experienced by the load during a momentum change felt by the load.

16. The pallet assembly of claim 11 wherein:

the at least one spring member is flexibly movable to absorb shock experienced by the load when the load is in transit.

17. A pod arranged to support a load and absorb shock experienced by the load, the pod comprising:

a body;

a face spaced from the body and oriented to be mounted to the underside of a load placed on the face; and at least one spring assembly disposed around the periphery of the body and extending between the body and the face, wherein the at least one spring assembly absorbs shock experienced by the load, wherein the face and the at least one spring assembly form a cavity configured to receive a body of a like pod disposed thereabove when arranged in a stacked orientation.

18. The pod of claim 17 wherein:

the at least one spring assembly includes a curvilinear spring member.

19. The pod of claim 17 wherein:

the at least one spring assembly includes an oval spring member.

20. The pod of claim 17 wherein:

the at least one spring assembly includes a plurality of spring assemblies each separated by a window.

21. The pod of claim 1 wherein:

the opening of the upper member, the at least one spring member, and a top surface of the lower member form a pocket for receiving a lower member of a like pod in order for the pod and the like pod to be nestable.

22. A pod arranged to support a load and absorb shock experienced by the load, the pod comprising:

a rigid lower member;

a rigid upper member positioned apart from the lower member for attachment to the underside of a load placed on the upper member; and at least one spring member connecting the lower member to the upper member, wherein the at least one spring member absorbs shock experienced by the load, wherein the upper member, the lower member, and the at least one spring member are integrally formed as a unitary member.

23. A pallet assembly arranged to support a load and absorb shock experienced by the load, the pallet assembly comprising:

a deck member and a pod attached to one side of the deck member, wherein the pod includes a rigid lower member, a rigid upper member, and at least one spring member, wherein the upper member is positioned apart from the lower member and is attached to the one side of the deck member, wherein the at least one spring member connects the lower member to the upper member and absorbs shock experienced by a load being supported by the deck member, wherein the deck member and the lower member, the upper member, and the at least one spring assembly of the pod are integrally formed to form a unitary construction.

* * * * *

UNITED STATES PATENT AND TRADEMARK OFFICE
CERTIFICATE OF CORRECTION

PATENT NO. : 6,644,218 B2
DATED : November 11, 2003
INVENTOR(S) : Robert V. Gruber It is certified that error appears in the above-identified patent and that said Letters Patent is hereby corrected as shown below:

Column 4,
Lines 23 and 32, delete "fine" and insert therefor -- define --

Column 7,
Line 23, delete "fine" and insert therefor -- define --

Column 8,
Line 43, delete "spring assembly" and insert therefor -- spring member --

Signed and Sealed this

Thirtieth Day of March, 2004

JON W. DUDAS
*Acting Director of the United States Patent and Trademark Office*